Feb. 14, 1956  R. A. HAYS, JR  2,734,590
APPARATUS FOR AUTOMATICALLY SETTING AND RELEASING VEHICLE BRAKES
Filed Feb. 7, 1955  2 Sheets-Sheet 1
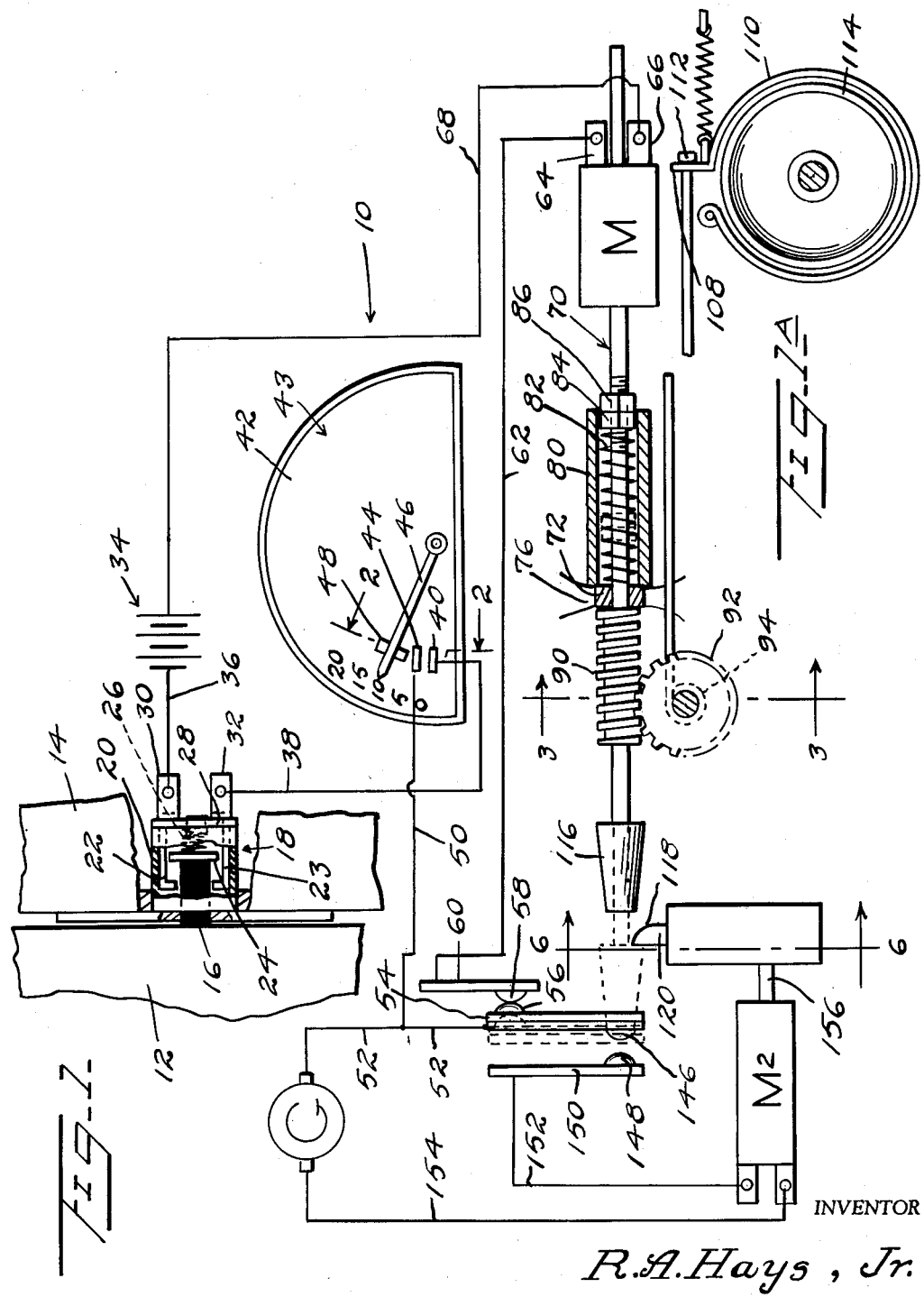
INVENTOR
R. A. Hays, Jr.
BY Kimmel & Crowell
ATTORNEYS Feb. 14, 1956  R. A. HAYS, JR  2,734,590
APPARATUS FOR AUTOMATICALLY SETTING AND RELEASING VEHICLE BRAKES
Filed Feb. 7, 1955  2 Sheets-Sheet 2
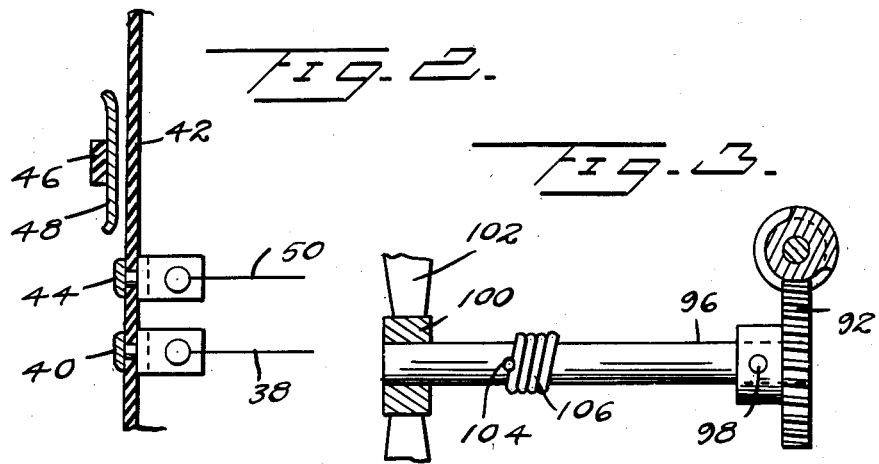
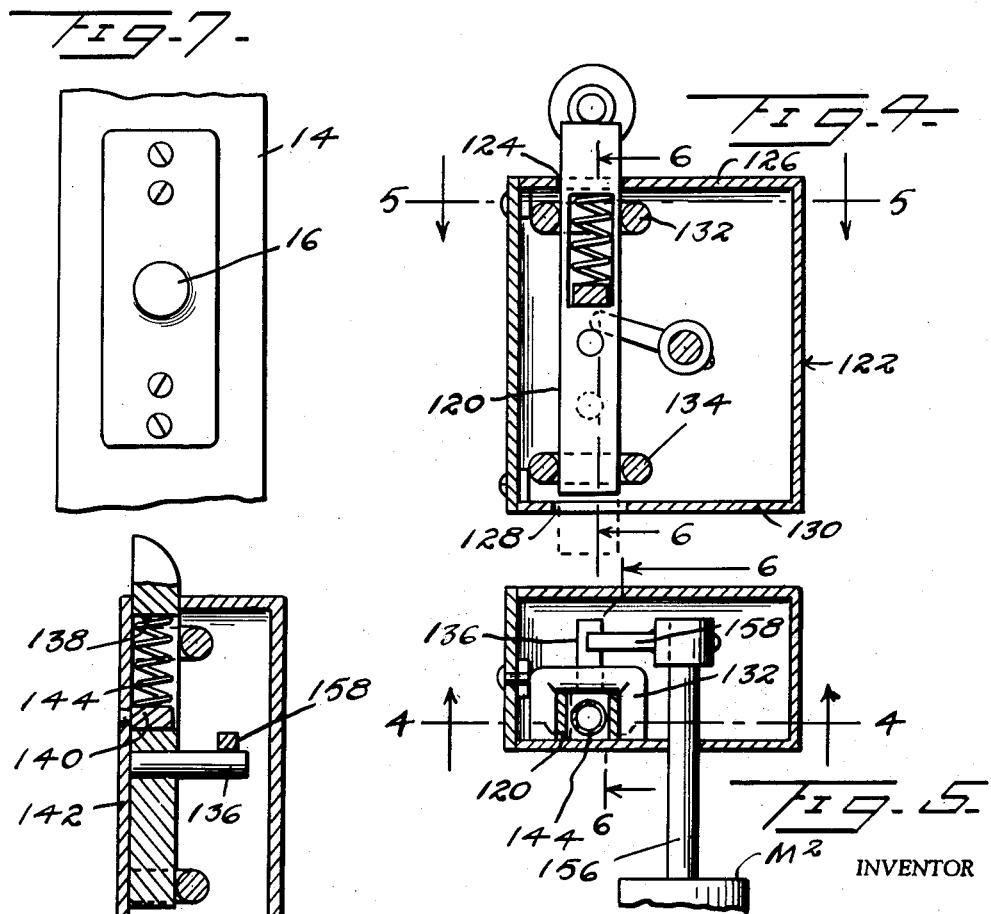
INVENTOR
R. A. Hays, Jr.
BY Kimmel & Crowell
ATTORNEYS United States Patent Office 2,734,590
Patented Feb. 14, 1956

2,734,590

APPARATUS FOR AUTOMATICALLY SETTING AND RELEASING VEHICLE BRAKES

Robert A. Hays, Jr., Atlanta, Ga.

Application February 7, 1955, Serial No. 486,666

4 Claims. (Cl. 180—82)

This invention relates to a braking device for wheeled vehicles, and more specifically to means for automatically applying automobile brakes when the driver leaves the car.

One of the primary objects of this invention is to provide speedometer control means for automatically setting the automobile brakes when the operator thereof leaves the vehicle.

Another object of this invention is to provide generator control means for automatically releasing the set brakes when the automobile is next operated.

A further object of this invention is to provide electrical control circuits for automatically setting automobile brakes when the operator leaves the vehicle and for releasing the set brakes when the operator next starts the vehicle motor.

A still further object of this invention is to provide means for automatically setting the brakes of a wheeled vehicle when the driver opens a door of the vehicle, and the speed of the vehicle is zero, the brakes remaining in set condition regardless of the number of times the door is opened and closed thereafter.

Other and further objects and advantages of the present invention will become more evident from a consideration of the following specification when read in the light of the annexed drawings, in which:

Figure 1 is a schematic illustration of brake setting and releasing means for wheeled vehicles constructed in accordance with the instant invention.

Figure 1A is a continuation of the invention as illustrated in Figure 1, Figure 1A showing the application of the braking means to a brake shoe.

Figure 2 is an enlarged fragmentary detail cross-sectional view taken on the line 2—2 of Figure 1, looking in the direction of the arrows.

Figure 3 is an enlarged detail cross-sectional view, partially in elevation, taken on the vertical plane of line 3—3 of Figure 1, looking in the direction of the arrows.

Figure 4 is an enlarged detail cross-sectional view taken on the line 4—4 of Figure 5, looking in the direction of the arrows.

Figure 5 is an enlarged detail cross-sectional view taken on the horizontal plane of line 5—5 of Figure 4, looking in the direction of the arrows.

Figure 6 is an enlarged detail cross-sectional view taken on the vertical plane of line 6—6 of Figure 1, looking in the direction of the arrows.

Figure 7 is a fragmentary end elevation of the door operated switch which controls one of the electric circuits involved in the present invention.

Referring now more specifically to the drawings, reference numeral 10 designates, in general, a mechanism for automatically setting the brakes of an automotive vehicle when the driver leaves the vehicle through one of the front doors and for releasing the applied brakes when the operator returns and starts the vehicle motor.

As seen in Figure 1, reference numeral 12 designates one of the front doors of the automobile, the door being shown in closed position in juxtaposed relation relative to the door jamb 14. In this position, the door 12 is engaged against an elongated substantially cylindrical plug 16 of a switch generally designated at 18. The plug 16 is adapted to reciprocate within a cylindrical housing 20 formed of a dielectric material and has mounted therein a pair of switch contact members 22, 23. The inner end of the plug 16 carries a cylindrical metallic disc 24 which forms a movable switch arm adapted to engage against the fixed switch contacts 22, 23 when the door 12 is opened.

A helicoidal spring 26 is mounted within the casing 20 and has one of its ends abutting against the disc 24 while the other end thereof engages against the end closure wall 28 of the casing 20. The spring 26 constantly tends to urge the plug 16 for movement away from the casing 20. The fixed switch contacts 22, 23 are connected with lugs 30 and 32, respectively, of which the lug 30 is connected to one side of a source of electric energy such as the car's battery 34, by means of a wire 36.

Wire 38 connects the lug 32 with a substantially rectangular fixed switch contact 40 secured to the dial 42 of the speedometer 43 of the automobile.

A second fixed switch contact 44 is also mounted on the dial 42 in spaced relation relative to the fixed contact 40. The speedometer indicating vane 46 has fixedly secured thereon a switch arm 48 which is adapted to bridge the fixed switch contacts 40, 44 when the speedometer has a zero reading. In this position, the arm 48 bridges the fixed contacts 40, 44 and effects an electrical connection therebetween.

Wires 50 and 52 connect the fixed switch contact 44 of a single pole double throw switch including a switch arm 54 provided with a contact 56 at one end thereof. The contact 56, in one position of the switch arm 54, is adapted to engage contact 58 which is carried by a fixed metallic element 60 that is connected through wire 62 with a lug 64, the latter being connected to one side of the motor M. The other side of the motor M is connected to a lug 66 which is, in turn, connected through wire 68 with the other side of the battery 34.

Thus it is seen that when the car door 12 is opened and the speedometer vane 46 is indicating a velocity of zero miles per hour, that is, the car being motionless, the disc 24 will close the switch contacts 22, 23 to establish a series circuit from the battery 34 to the motor M. The circuit reads from one side of the battery 34, wire 36, lug 30, switch contact 22, disc 24, switch contact 23, lug 32, wire 38, switch contact 40, switch arm 48, switch contact 44, wires 50, 52, switch arm 54, contacts 56 and 58, fixed metallic element 60, wire 62, lug 64 to one side of the motor M and from the other side of the motor M through lug 66 and wire 68 to the other side of the battery 34.

The motor M now having been energized drives its drive shaft 70 which is supported in suitable bearings 72 carried by struts 76 which are fixedly secured to the chassis of the vehicle. For reasons to become more evident below, the drive shaft 70 is of a type which permits axial reciprocation. An elongated substantially hollow tubular casing 80 is fixedly secured to the strut 76 and encloses a portion of the drive shaft 70 adjacent the motor M.

A helicoidal spring 82 is disposed within the casing 80 and surrounds a portion of the drive shaft 70. As is seen in Figure 1, the helicoidal spring 82 has one of its ends engaging against the bearing 72 while the other end thereof engages a washer 84 threaded on the drive shaft 70 and held in adjusted locked position by means of lock nut 86.

The shaft 70, intermediate the ends thereof, has mounted thereon a worm gear 90 which meshes with a worm gear 92 fixedly secured to the chassis by means of a standard 94.

The worm gear 92 (see Figure 3) is fixedly mounted on one end of a shaft 96 by means of set screw 98, and the other end of the shaft 96 is journalled in a bearing 100 carried by a strut 102 which is in turn connected to the chassis of the vehicle. One end 104 of a flexible cable 106 is affixed to the shaft 96, while the other end thereof (see Figure 1A) extends through a plate 108 that is connected with a brake band 110. The other end of the cable 106 has secured thereto an enlarged ferrule or stop member 112 which prevents the cable 106 from being detached from the plate 108.

By virtue of the above described construction it is obvious that the energization of the motor M will drive the shaft 70 which, in turn, through the worm shaft 90 and worm gear 92, will effect rotation of the shaft 96 and will wind the cable 106 thereon. As the cable is wound the brake band 110 engages tightly against the brake drum 114 and applies a braking force thereto.

The shaft 70 has a frusto-conical element 116 fixedly secured to the free end thereof. After the proper braking force has been applied to the brake drum 114, the shaft 96 ceases to rotate and the drive shaft 70 and the element 116 move laterally to the left, as viewed in Figure 1, under the influence of the now stationary worm gear 92 and rotating worm shaft 90. As this movement is effected, the spring 82 is compressed and the element 116 engages the cam surface 118 of an elongated substantially rectangular bar 120 to effect a depression thereof.

Referring now to Figures 4, 5, and 6, it is seen that the bar 120 is mounted for reciprocation within a housing 122, the upper end thereof normally projecting upwardly through an opening 124 formed in the upper wall 126 of the housing 122.

A similar opening 128 is formed in the lower housing wall 130, the opening 128 being aligned with the opening 124 whereby the bar 120 may pass therethrough when the same is in its depressed position.

A pair of spaced rings 132, 134 engage about the bar 120 and are fixedly secured to the housing 122, the rings 132, 134 serving as guide means for the bar 120. In Figures 5 and 6 it is seen that the bar 120 has fixedly secured thereto one end of a pin 136 which projects laterally therefrom.

The bar 120 is provided with a vertically extending slot 138 which extends from side to side thereof intermediate its ends. A substantially rectangular block 140 is disposed within the lower end of the slot 138 and is fixedly secured to the side wall 142 of the housing 122. The block 140 limits the upward movement of the bar 120. A helicoidal spring 144 is also disposed within the slot 138 with an end thereof abutting against the block 140. The other end of the spring 144 engages the upper end of the slot 138 whereby the bar 120 is constantly biased for movement upwardly through the opening 124.

Now as the element 116 completely passes the cam surface 118 of the bar 120, the bar 120 moves upwardly under the influence of the spring 144 and is returned to its normal position, behind the element 116.

At this time the shaft 70 engages the other end of the switch arm 54 and moves the arm to the dotted line position shown in Figure 1. This movement of the switch arm 54 breaks the above described series circuit at the contact points 56, 58 whereby the motor M is deenergized.

Simultaneously, switch contact 146 fixedly secured to the other end of the switch arm 54 engages the fixed switch contact 148 mounted on an elongated metallic member 150. The closure of the switch contacts 146, 148 establishes a series circuit to a second motor, designated as M2. The circuit is seen to comprise the generator G of the automobile which has a side thereof connected with the switch arm 54 through wire 52. The current passes through the arm 54 and its contact 146 from whence it passes to the contact 148, member 150, and through wire 152 to one side of the motor M2. The other side of the motor M2 is connected with the other side of the generator G through wire 154.

From the foregoing description it is seen that under the described conditions, the automobile brakes are now held in their braking position and that all of the electrical circuits are deenergized.

Upon return of the operator to the vehicle and upon starting the internal combustion engine therefor, current is supplied to the motor M2 from the generator G. Energization of the motor M2 effects a rotation of drive shaft 156 which has securely mounted thereon a striker lever 158.

As is seen in Figures 4, 5, and 6, the shaft 156 extends through the housing 122 in such a manner that rotation of the striker 158 effects an engagement thereof with the pin 136 which forces the bar 120 downwardly until the same is entirely clear of the frusto-conical element 116. The element 116 now being free, the shaft 70 is moved laterally to the right, as viewed in Figure 1, under the tension of the compressed spring 82. Movement of the shaft in this direction causes the withdrawal of the element 116 with the switch arm 54 thereby breaking the series circuit to the motor M2. Simultaneously, the first described series circuit is now reestablished by the reengagement of the contacts 56, 58.

It is now obvious that once the brakes have been applied automatically, subsequent opening and closing of the door will not effect a release thereof, the same only being accomplished upon the establishment of generator current. Once the motor M2 has been energized, the device is ready, automatically, to effect a subsequent reapplication of the brakes when the door is opened, the motor is not operating, and the speed of the vehicle is zero.

Having described and illustrated one embodiment of this invention, it will be understood that the same is offered merely by way of example, and that the invention is to be limited only by the scope of the appended claims.

What is claimed is:

1. Apparatus for automatically setting and releasing the brakes of an automotive vehicle having an internal combustion engine and an ignition circuit therefor, said apparatus comprising an electrical motor and a series circuit, therefor, said series circuit including a door operated switch, a source of energy, a speedometer controlled switch, said motor having an axially movable drive shaft, means on said drive shaft for applying a braking force to said brakes, means operable upon extension of said drive shaft in one direction to effect deenergization of said series circuit, means for maintaining said shaft in its extended position during the deenergization of said series circuit to maintain said braking force on said brakes, a second electric motor and a series electric circuit therefor including the generator of said ignition circuit, a normally open control switch for said second circuit, said control switch being moved to its closed position upon movement of said drive shaft to its extended position, means mounted on the drive shaft of said second motor for effecting release of said drive shaft of said first motor, and resilient means for returning said drive shaft to its original position and consequently relieving said braking force.

2. Apparatus for automatically setting and releasing the brakes of an automotive vehicle having an ignition circuit including a generator and a battery, a motor having an axially movable drive shaft, resilient means surrounding said drive shaft intermediate its ends, said resilient means constantly tending to bias said drive shaft for movement in one direction, a worm shaft fixedly secured to said drive shaft, a worm gear meshed with said worm shaft, said worm gear being mounted on one end of a cross shaft and being rotatable therewith, a flexible cable having one end thereof connected with said cross shaft and its other end fixedly secured to the brake shoe of a brake having a brake drum, a frusto-conical element fixedly secured to the free end of said drive shaft, said frusto-conical element being adapted to engage, when said drive shaft is in its extended position, a switch arm of a single pole double throw switch, means for locking said frusto-conical element in its extended position, an electrical motor including a series circuit therefor, said electrical motor being operable to effect the release of said frusto-conical element whereby said drive shaft is returned to its original position under the force of said spring, said first series circuit for said first motor including a vehicle door operated switch, a pair of spaced switch contacts fixedly secured to the dial of a speedometer for said vehicle, a switch arm mounted on the indicating vane of said speedometer, said switch arm bridging said switch contacts when the speedometer reading is zero, said switch arm of said single pole double throw switch, one of the fixed switch contacts of said single pole double throw switch, and said battery, said second series circuit for said second motor including said generator, said switch arm of said single pole double throw switch, and the other fixed switch contact of said single pole double throw switch.

3. Apparatus for automatically setting and releasing the brakes of a vehicle as described in claim 2, and said means for holding said drive shaft in its said extended position comprising an elongated bar mounted for reciprocation within a housing, said bar having an end thereof adapted for movement into and out of the path of movement of said frusto-conical element, resilient means for constantly urging one end of said bar into said path of movement, a pin having an end thereof fixedly secured to said bar, and a striker lever fixedly secured to the drive shaft of said second motor, said striker being adapted to engage said pin to force said bar for movement inwardly of said housing to effect release of said frusto-conical element.

4. Apparatus for automatically setting and releasing the brakes of an automotive vehicle, said apparatus comprising an electrical motor and a series circuit therefor, a source of electrical energy for said circuit, a speedometer controlled switch, said motor having an axially movable drive shaft, means on said drive shaft for applying a braking force to said brakes, means operable upon extension of said drive shaft in one direction to effect de-energization of said series circuit, means for maintaining said shaft in its extended position during the de-energization of said series circuit to maintain said braking force on said brakes, and means mounted on said vehicle for effecting release of said drive shaft of said motor, and resilient means for returning said drive shaft to its original position and consequently releasing said braking force.

References Cited in the file of this patent
UNITED STATES PATENTS

| | | |
|---|---|---|
| 1,843,966 | Adams | Feb. 9, 1932 |
| 1,928,750 | Apple et al. | Oct. 3, 1933 |
| 1,972,659 | Kopay | Sept. 4, 1934 |
| 2,034,233 | Hasselbaum | Mar. 17, 1936 |
| 2,110,125 | Galloway | Mar. 8, 1938 |
| 2,594,155 | Guernsey et al. | Apr. 2, 1952 |